United States Patent
Okamoto et al.

(10) Patent No.: US 11,100,078 B2
(45) Date of Patent: Aug. 24, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Takuya Okamoto, Kanagawa (JP); Toshiyuki Komoda, Kanagawa (JP); Shinsuke Nakazawa, Kanagawa (JP); Yoshihito Suezawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 147 days.

(21) Appl. No.: 16/154,992

(22) Filed: Oct. 9, 2018

(65) Prior Publication Data

US 2019/0121864 A1 Apr. 25, 2019

(30) Foreign Application Priority Data

Oct. 23, 2017 (JP) .............................. JP2017-204467

(51) Int. Cl.
*G06F 16/23* (2019.01)
*G06F 3/0484* (2013.01)
*G06F 3/048* (2013.01)
*G06F 17/00* (2019.01)

(52) U.S. Cl.
CPC .......... *G06F 16/23* (2019.01); *G06F 3/04845* (2013.01); *G06F 3/04847* (2013.01); *G06F 3/048* (2013.01); *G06F 3/0484* (2013.01)

(58) Field of Classification Search
CPC .. G06F 16/23; G06F 3/04847; G06F 3/04845; G06F 17/30; G06F 3/048; G06F 17/30002; G06F 3/0484
See application file for complete search history.

(56) References Cited

U.S. PATENT DOCUMENTS

| | | | | |
|---|---|---|---|---|
| 2002/0113823 | A1* | 8/2002 | Card | G06F 3/0483 715/776 |
| 2005/0283742 | A1* | 12/2005 | Gusmorino | G06F 3/04817 715/839 |
| 2008/0218524 | A1* | 9/2008 | Takagi | G06F 3/04883 345/522 |

(Continued)

FOREIGN PATENT DOCUMENTS

| | | |
|---|---|---|
| JP | 2009-048450 A | 3/2009 |
| JP | 2010-261975 A | 11/2010 |
| JP | 2015-219738 A | 12/2015 |

OTHER PUBLICATIONS

May 18, 2021 Office Action issued in Japanese Patent Application No. 2017-204467.

*Primary Examiner* — Quoc A Tran

(74) *Attorney, Agent, or Firm* — Oliff PLC

(57) ABSTRACT

An information processing apparatus includes a display controller that controls display of a display image, which is formed of a reduced image of a document by adding an accompanying image. The display controller controls display of the display image in a manner that when a display magnification of the display image is changed, the accompanying image is resized in a first direction in accordance with a magnification identical to the display magnification and resized in a second direction that differs from the first direction in accordance with a magnification that differs from the display magnification.

3 Claims, 6 Drawing Sheets

(56) References Cited

U.S. PATENT DOCUMENTS

| | | | |
|---|---|---|---|
| 2009/0160875 A1* | 6/2009 | Chikyu | G06F 40/103 345/660 |
| 2011/0016429 A1* | 1/2011 | Yoshihama | G06F 3/04817 715/838 |
| 2011/0188094 A1* | 8/2011 | Nakazawa | H04N 1/04 358/474 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-204467 filed Oct. 23, 2017.

BACKGROUND

(i) Technical Field

The present invention relates to an information processing apparatus and a non-transitory computer readable medium.

(ii) Related Art

There are various document management software applications known in the related art, which are capable of displaying a reduced image of a document, that is, a thumbnail, so that contents of the document are recognizable by such a reduced image. Some of such document management software applications have a function of displaying an image that represents the thickness of the document and adding the image to the thumbnail so that the relative volume of the number of pages included in the document is recognized.

A fair number of document management software applications provide a display magnification function that enables resizing of the thumbnail display size. When the thumbnail is reduced in size by using this function, the thickness of the document is also reduced because the entire thumbnail is reduced in size.

SUMMARY

According to an aspect of the invention, there is provided an information processing apparatus including a display controller that controls display of a display image, which is formed of a reduced image of a document by adding an accompanying image. The display controller controls display of the display image in a manner that when a display magnification of the display image is changed, the accompanying image is resized in a first direction in accordance with a magnification identical to the display magnification and resized in a second direction that differs from the first direction in accordance with a magnification that differs from the display magnification.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described with reference to the drawings.

Figure 1:
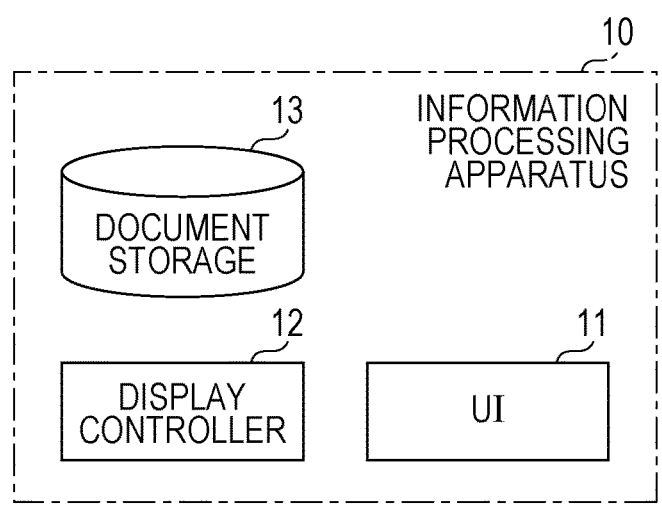
FIG. 1 is a block diagram depicting an information processing apparatus according to an exemplary embodiment of the invention.
Figure 2:
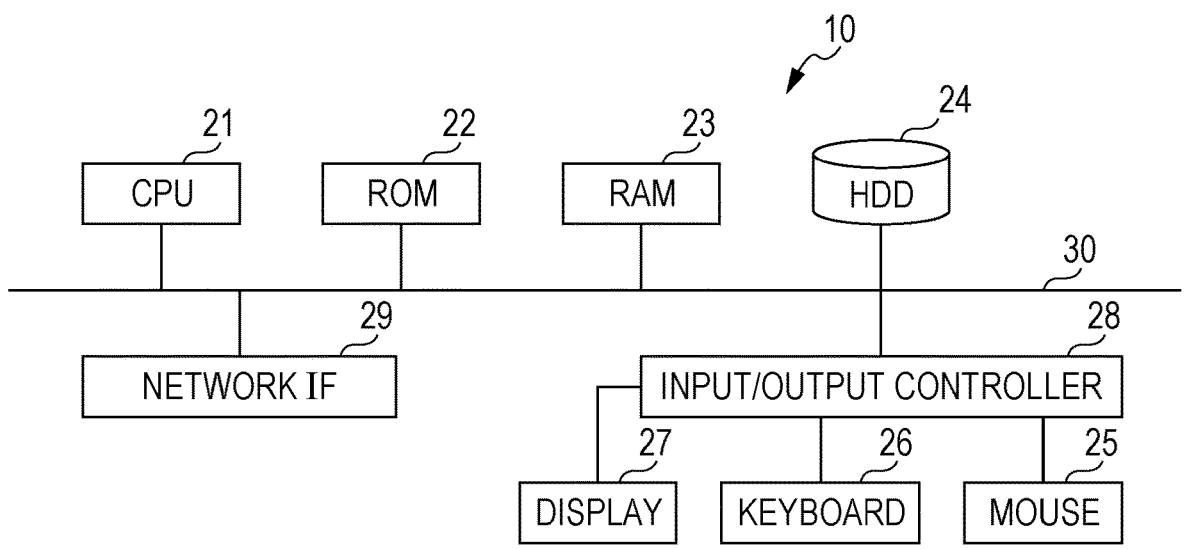
FIG. 2 illustrates a hardware configuration of a computer that constitutes the information processing apparatus according to this exemplary embodiment.

FIG. 1 is a block diagram depicting an information processing apparatus 10 according to an exemplary embodiment of the invention. FIG. 2 illustrates a hardware configuration of a computer that constitutes the information processing apparatus 10 according to this exemplary embodiment.

The information processing apparatus 10 according to this exemplary embodiment may be realized by using a computer having general-purpose hardware, such as a personal computer (PC). As depicted in FIG. 2, the information processing apparatus 10 is configured such that a central processing unit (CPU) 21, a read-only memory (ROM) 22, a random-access memory (RAM) 23, a hard disk drive (HDD) 24, an input/output controller 28, and a network interface (IF) 29 are connected to an internal bus 30. A mouse 25 and a keyboard 26, equipped as an input unit, and a display 27, equipped as a display unit, are each connected to the input/output controller 28. The network IF 29 is equipped as a communication unit. In an information processing apparatus using a liquid crystal display, such as a tablet terminal, as a user interface, the liquid crystal display serves as an input unit and a display unit.

The information processing apparatus 10 according to this exemplary embodiment includes a user interface (UI) 11, a display controller 12, and a document storage 13 as depicted in FIG. 1. In FIG. 1, elements that are not used for description of this exemplary embodiment are omitted.

The user interface 11 is a user interface unit that receives information that is input by using the mouse 25 or the keyboard 26 and outputs information to the display 27 by using various screen images. The display controller 12 realizes a function of document management software and performs display control to cause the user interface 11 to display thumbnails of documents stored in the document storage 13 and documents received via a network.

The document storage 13 stores document files to be displayed and document information such as attributes of the document files to be displayed. In this exemplary embodiment, the term, "document file", refers to not only a file that is constituted only by character sequences, which is a document file in a narrow sense, but also a file generated in such a way that an amount of contents in a document is countable in a unit such as pages. It is to be understood that the term, "document file", is used in a broad sense and may include not only character sequences, but also images such as drawings and photographs.

Each of the elements 11 and 12 in the information processing apparatus 10 is realized by cooperative operation between a computer that constitutes the information processing apparatus 10 and programs operating on the CPU 21 mounted in the computer. The document storage 13 is realized by using the HDD 24 mounted in the information processing apparatus 10. Alternatively, the document storage 13 may also be realized by using the RAM 23 or by using an external storage unit via a network.

The programs used in this exemplary embodiment may be provided by transmission via the communication unit or in a stored form in a recording medium readable by a computer, such as a compact-disc read-only memory (CD-ROM) or a Universal Serial Bus (USB) memory. The programs provided by using the communication unit or the recording medium are installed into the computer, and the CPU 21 of the computer performs the programs consecutively to realize various processes.

Figure 3:
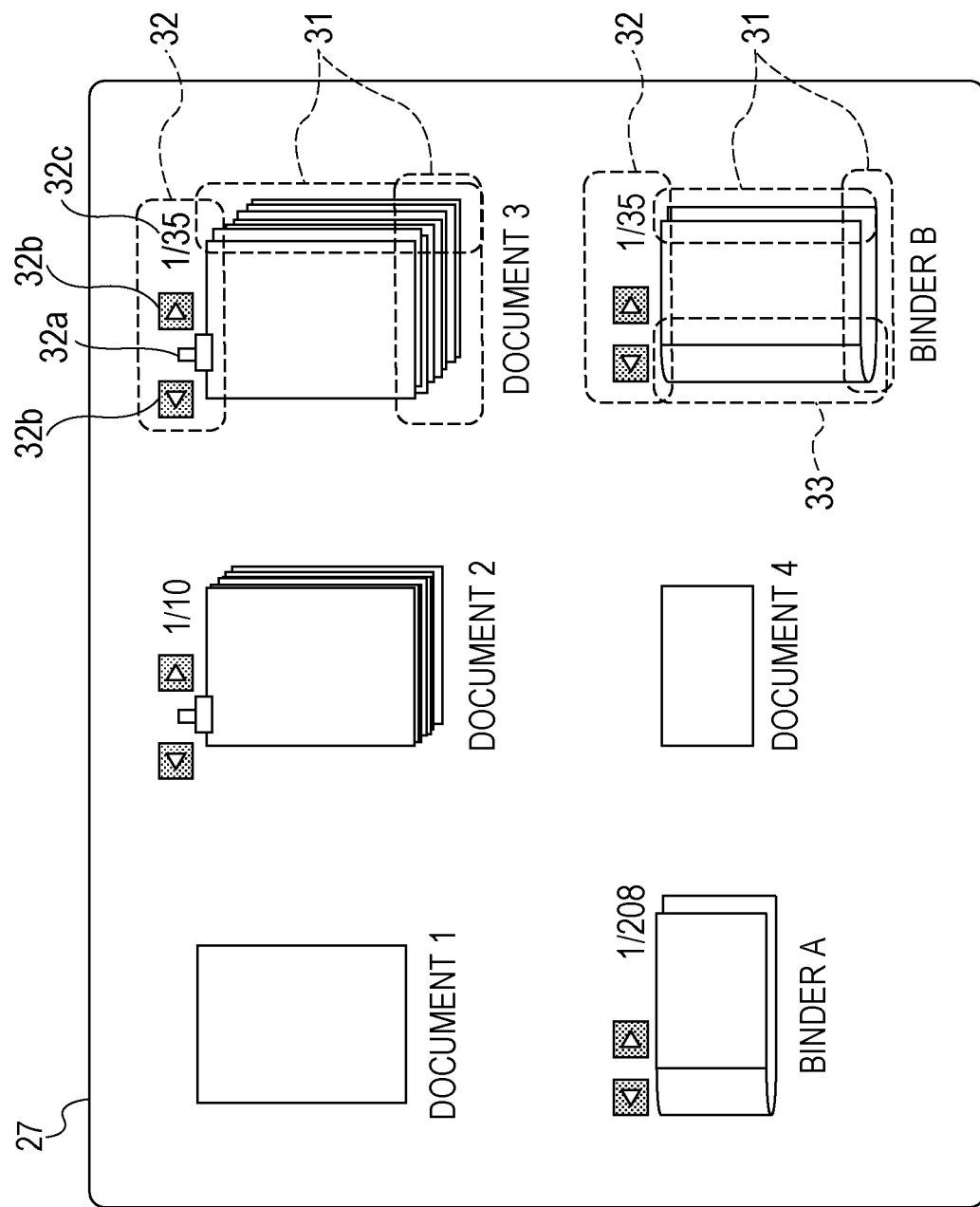
FIG. 3 illustrates an example presentation of multiple documents, which are presented by the information processing apparatus according to this exemplary embodiment.

FIG. 3 illustrates an example presentation of documents presented on the display 27. In FIG. 3, thumbnails representing documents, such as documents 1 to 4, and thumbnails representing binders formed of multiple documents bound together, such as binders A and B, are depicted.

A document thumbnail is produced from a reduced image of a document. To be precise, the document thumbnail includes a reduced image of a document and accompanying images of the document that are generated when needed and added to the reduced image. In this exemplary embodiment, accompanying images 31 and 32 are presented. In FIG. 3, the accompanying image 31 is an image representing document thickness. It is apparent from a comparison among the documents 1, 2, and 3 that a thickness width of the accompanying image 31, which is a width representing document thickness, increases as the document becomes thicker, leading to easy visual recognition of an amount of contents in the document. The documents 1 and 4 each have one page and the accompanying image 31 is not added. The accompanying image 32 is an image to enable selection of a page to be presented in a document having multiple pages and includes a clip image 32a to bind the multiple pages, buttons 32b to change a reduced image to be presented to the subsequent page or to the preceding page, and page information 32c presenting the total number of pages of the document and the page number of a current display image. The documents 1 and 4 each have only one page and no accompanying image 32 is added.

The accompanying image 31 representing a thickness (hereinafter, referred to as a thickness image) represents document thickness as described above. The document thickness, that is, the amount of contents in the document, is typically determined by the number of pages that constitute the document but not determined only by the number of pages. For example, when a sheet of A3 size is folded and bound into a document of A4 size, the number of pages does not increase, but the document thickness increases. In such a case, when a sheet of different size is folded and bound into a document, the thickness image 31 of the document may be presented by enlarging the thickness width of the thickness image 31. Other than presenting the amount of contents in the document described above, the thickness image 31 may represent information on, for example, the number of characters, the number of images, and the like. The thickness width of the thickness image 31 may be determined based on the overall consideration of such information.

Similarly to the thumbnails of the documents, the accompanying image 32 to change pages that is to be presented are also added to the binders. The accompanying image 32 does not include a clip image to bind a document, but a band 33 is added instead as an accompanying image to visually indicate that multiple documents are bound. Similarly to the case of a document, a thickness width of the thickness image 31 of the binder is changed in accordance with an amount of documents bound by the binder.

Although a reduced image of a document may be generally called a "thumbnail", in this exemplary embodiment, as described above, a display image formed by adding accompanying images to a reduced image of a document is called a "thumbnail".

By using a display magnification function for thumbnails provided by the document management software, the thumbnails presented on a screen may be resized. The display magnification may typically be specified by choosing a display magnification (for example, 67%, 100%, 200%, page width, specify magnification, or the like) in a display menu placed on a menu bar. The exemplary embodiment is characteristic in that, when the display magnification of a thumbnail is changed, display of the accompanying images 31 and 33 is controlled such that the accompanying images 31 and 33 are resized in a first direction in accordance with a magnification identical to the display magnification and resized in a second direction that differs from the first direction in accordance with a magnification that differs from the display magnification. Characteristic display control processing by the display controller 12 in this exemplary embodiment will be described below with reference to FIG. 4, FIG. 5, and FIGS. 6A to 6C.

Figure 4:
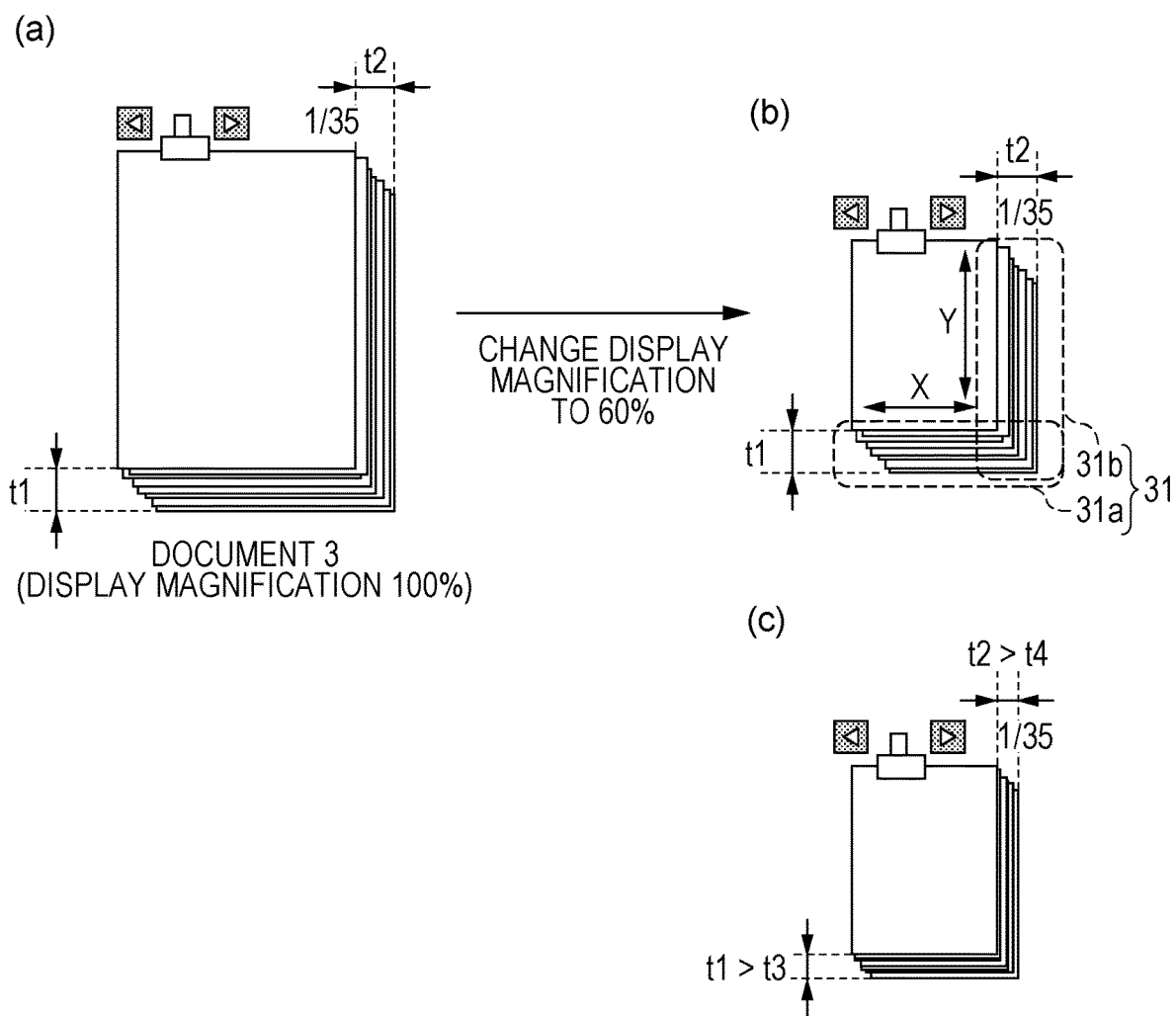
FIG. 4 illustrates document images presented by the information processing apparatus according to this exemplary embodiment when the information processing apparatus changes display magnification of the document images.

Only the document 3, which is depicted in FIG. 3, is illustrated in FIG. 4, and the thumbnail of a document will be described using the document 3 as a representative example. If the thumbnail of the document 3 is presented at a current display magnification of 100%, FIG. 4 (a) indicates that the thickness widths of the document represented by the thickness image 31 are t1 and t2. The thickness width t1 representing a thickness at the bottom of the reduced image may be the same as the thickness width t2 representing a thickness on the side. If a user inputs an instruction to change the display magnification of the thumbnail from 100% to 60% under this display condition, the entire thumbnail is typically reduced to 60% in accordance with a change in the display magnification to 60% as depicted in FIG. 4 (c). Because the thickness image is also reduced in size proportionally in all directions to 60%, the thickness image is reduced in directions representing the thickness of the document. Thus, thickness widths t3 and t4 of the document after the reduction become smaller than t1 and t2, which are the thickness widths at a display magnification of 100%, respectively, and the thickness image is presented as a thinner image. If the thickness image is presented at such a reduced size, it is difficult to visually recognize the thickness of the document, and the effectiveness of the thickness image through which a user is able to recognize the amount of contents in the document may be reduced.

FIG. 4 (b) illustrates an example presentation obtained by performing the characteristic display control processing in this exemplary embodiment. In contrast to FIG. 4 (c), while the reduced image itself is reduced to 60% as instructed, the thickness image of the document is not resized in accordance with the instructed display magnification, as depicted in this example. Specifically, the length of a thickness image 31a in the X direction (first direction), which represents the longitudinal direction of the thickness image 31a placed at the bottom of the reduced image, is resized by the display controller 12 to a display magnification identical to the display magnification of the reduced image in accordance with the reduction of the reduced image. On the other hand, the length of the thickness image 31a in the Y direction (second direction), which represents the document thickness direction of the thickness image 31a, is resized by the display controller 12 to a display magnification that differs from the display magnification of the reduced image (60%). In this exemplary embodiment, the thickness width t1 is maintained without changing by unchanging the current display magnification, that is, maintaining the display magnification (100%), which is the display magnification before changing.

A thickness image 31b on the side of the reduced image is also processed in the same manner by the display controller 12. Specifically, the length of the thickness image 31b in the Y direction (first direction), which represents the longitudinal direction of the thickness image 31b placed on the side of the reduced image, is resized by the display controller 12 to a display magnification identical to the display magnification of the reduced image in accordance with the reduction of the reduced image. On the other hand, the length of the thickness image 31b in the X direction (second direction), which represents the document thickness direction of the thickness image 31b, is resized by the display controller 12 to a display magnification that differs from the display magnification of the reduced image (60%). In this exemplary embodiment, in the same manner as the thickness image 31a, the thickness width t2 is maintained without changing by unchanging the current display magnification, that is, maintaining the display magnification (100%), which is the display magnification before changing.

According to this exemplary embodiment, the thickness image 31 is not resized in accordance with the display magnification as instructed. Specifically, in the example described above, the thickness image 31 is not reduced in the thickness direction, and the thickness widths t1 and t2 are maintained. Thus, the thickness of the document remains to be easily recognizable visually even if the reduced image is reduced. Consequently, the user is able to recognize the amount of contents in the document by using the thickness image of the document even if the reduced image is reduced.

In this exemplary embodiment, the thickness widths t1 and t2 of the thickness image 31 are unchanged to maintain the visibility that has been obtained before changing the display magnification. However, the thickness widths t1 and t2 of the thickness image 31 may be changed as long as the visibility of the document thickness is maintained. For example, in response to an instruction to resize the display magnification to 40%, while the reduced image is reduced to 40%, the thickness width of the thickness image 31 is reduced to 80%. Thus, the length of the thickness image 31 in the thickness direction is reduced by an amount of change smaller than the amount of change by which the reduced image is resized in accordance with the display magnification as instructed (for example, 40%). In this example, the visibility of the thickness widths t1 and t2 of the thickness image 31 may be maintained by the reduction to 80%.

In the above description, although the case of reducing thumbnails in size is described, enlarging thumbnails may be treated in the same manner. Specifically, when a display magnification to enlarge the presentation of a thumbnail is specified, the display controller 12 enlarges a reduced image in accordance with the specified display magnification. The display controller 12 enlarges the thickness image 31 in accordance with a magnification identical to the display magnification of the reduced image in the longitudinal direction but maintains the thickness widths t1 and t2 without changing. Alternatively, the thickness widths t1 and t2 of the thickness image 31 may be enlarged to a display magnification (for example, 120%) by an amount of change smaller than the amount of change by which the reduced image is resized in accordance with the display magnification as instructed (for example, 200%).

In this exemplary embodiment, because the thumbnails are resized in a two-dimensional coordinate plane, the first direction and the second direction described above are typically orthogonal to each other. However, this is not limiting, and the first direction and the second direction may be determined in accordance with a presentation method of the thumbnails. In this exemplary embodiment, although the thumbnails of documents and binders are described as examples, the display control for the thumbnails described above may be applied to other kinds of accompanying images such as stickers or the like that may be added to reduced images.

The accompanying image 32, which is also added to a reduced image, as is the thickness image 31, including the clip image 32a, continues to be presented in the same size and form without being resized in either of the first or second directions even when the display magnification is changed.

Figure 5:
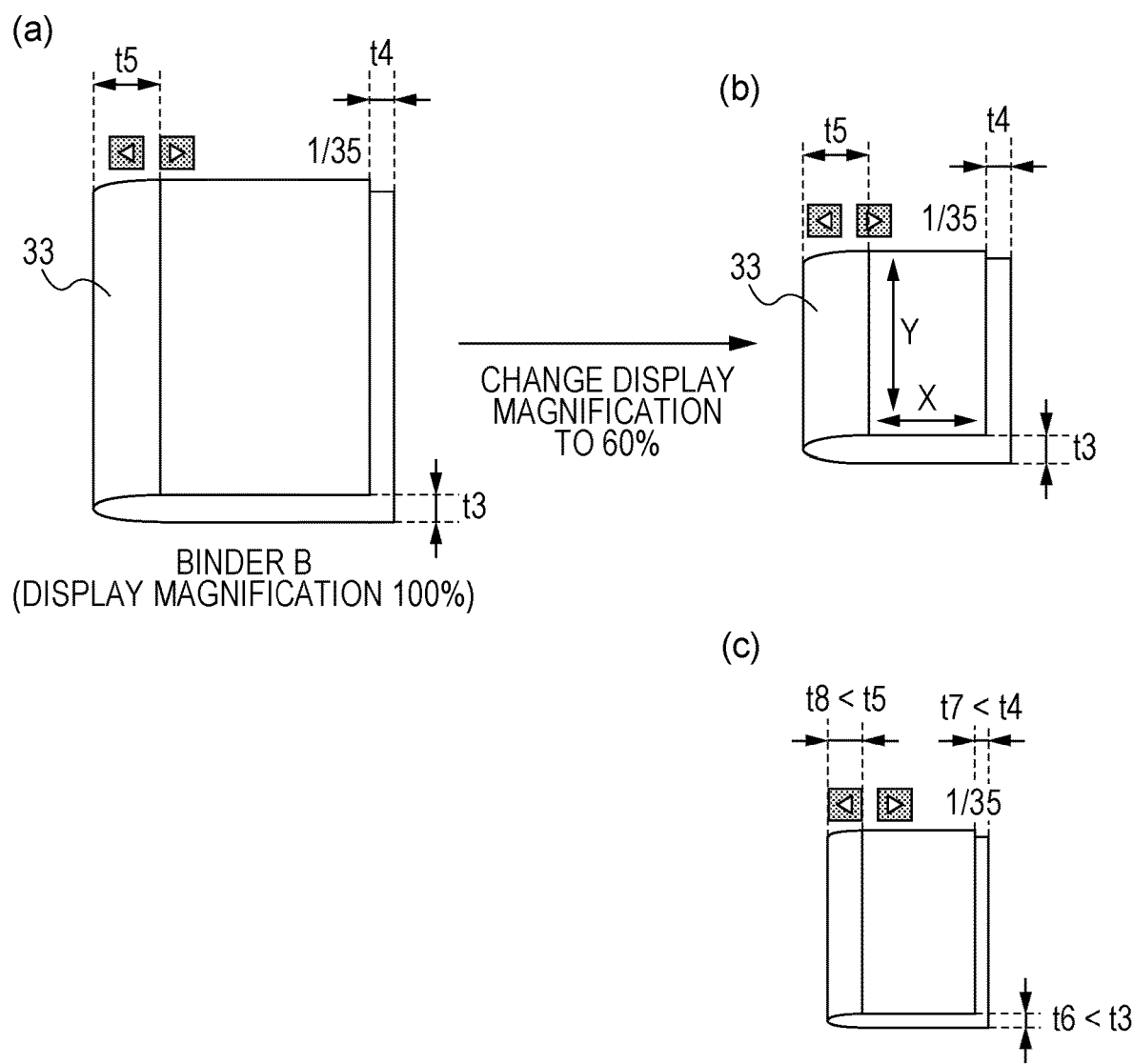
FIG. 5 illustrates binder images presented by the information processing apparatus according to this exemplary embodiment when the information processing apparatus changes display magnification of the binder images.

Only the binder B, which is depicted in FIG. 3, is illustrated in FIG. 5, and the thumbnail of a binder will be described using the binder B as a representative example. If the thumbnail of the binder B is presented at a current display magnification of 100%, FIG. 5 (a) indicates that the thickness widths of the binder represented by the thickness images are t3 and t4. The thickness width t3 representing a thickness at the bottom of the reduced image may be the same as the thickness width t4 representing a thickness on the side. The display control of the thickness images of the binder is the same as the display control of the thickness images 31 of a document described above, and description thereof will be omitted. Here, the band 33, which is unique to the binder, will be described.

As described above, the band 33 is added to a thumbnail of a binder as an accompanying image so that the binder is visually identifiable. A function to start an application is assigned to the band 33, and the application is started, for example, by an operation such as double-clicking on the band 33. The application has a function such as opening a new window and presenting, in the new window, information on an index or the like of the documents bound in the binder.

For example, if the thumbnail of the binder B is presented at a current display magnification of 100% in FIG. 5 (a), FIG. 5 (a) indicates that the width of the band 33 is t5. If a user inputs an instruction to change the display magnification of the thumbnail to 60% under this display condition, the entire thumbnail is typically reduced to 60% in accordance with a change in the display magnification to 60% as depicted in FIG. 5 (c). Because the image of the band 33 is also reduced in size proportionally in all directions to 60%, the width of the band 33 is reduced, and the width t8 of the band 33 after the reduction is smaller than the width t5, which is the width at a display magnification of 100%, leading to a narrow image being presented. If the width of the band 33 is presented at such a reduced size, the user may have a difficulty in operation such as double-clicking on the binder, and the operability of the binder decreases.

FIG. 5 (b) illustrates an example presentation obtained by performing the characteristic display control processing in this exemplary embodiment. In contrast to FIG. 5 (c), while the reduced image itself is reduced to 60% as instructed, the width of the band 33 is not resized in accordance with the instructed display magnification, as depicted in this example. Specifically, the length of the band 33 in the Y direction (first direction), which represents the longitudinal direction of the band 33, is resized by the display controller 12 to a display magnification identical to the display magnification of the reduced image in accordance with the reduction of the reduced image. On the other hand, the length of the band 33 in the X direction (second direction), which represents the thickness direction of the band 33, is resized by the display controller 12 to a display magnification that differs from the display magnification of the reduced image (60%). In this exemplary embodiment, the width t5 of the band 33 is maintained without changing by unchanging the current display magnification, that is, maintaining the display magnification (100%), which is the display magnification before changing.

According to this exemplary embodiment, the band 33 is not resized in accordance with the display magnification as instructed. Specifically, in the example described above, the band 33 is not reduced, and the width t5 of the band 33 is maintained. Thus, the operability of the band 33 is maintained even if the reduced image is reduced. It goes without saying that the visibility is also maintained in addition to the operability as is the case for the thickness of the binder. Specifically, in a case where a user is allowed to specify the color of the band 33 and the color of the band 33 happens to be the same as or similar to the color of the cover of the binder, a narrow width of the band 33 reduces the visibility of the band 33. According to this exemplary embodiment, the decrease in visibility is avoided because the width of the band 33 is maintained.

In the same manner as is described for the thumbnails of the documents, the band 33, which is one of the accompanying images, may also be subjected to the display control in which the length in the thickness direction of a document is resized by an amount of change smaller than the amount of change by which the reduced image is resized in accordance with the display magnification as instructed and the display control in which the thickness image 31 of a document is enlarged.

When the thickness images of documents or binders are not reduced in accordance with the specified display magnification and maintain the original thickness as in this exemplary embodiment, thumbnails may be presented superposed. Such presentation will be described below.

Figure 6A:
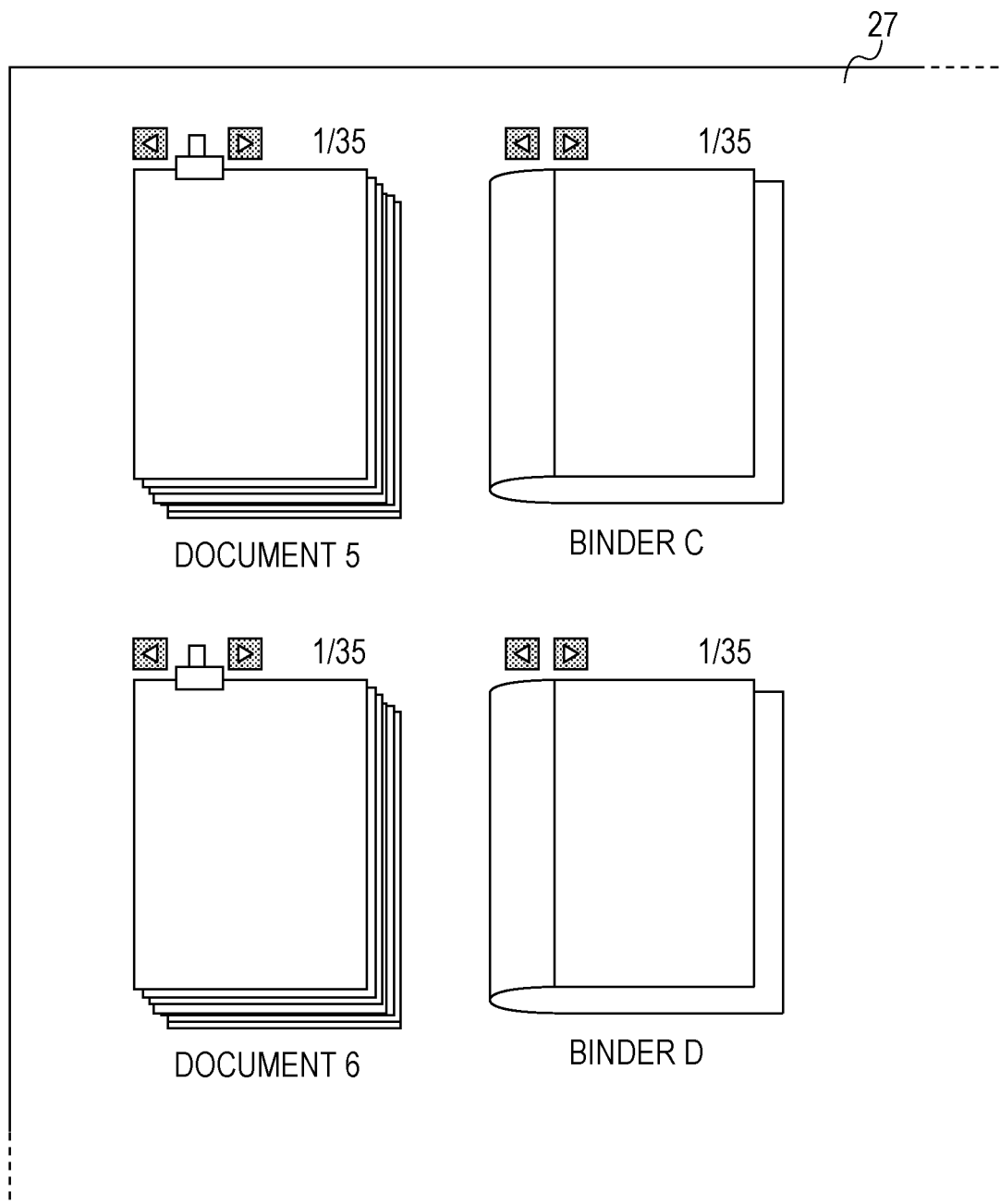
FIG. 6A illustrates a portion of a display screen in which documents and binders are presented by the information processing apparatus according to this exemplary embodiment.
Figure 6B:
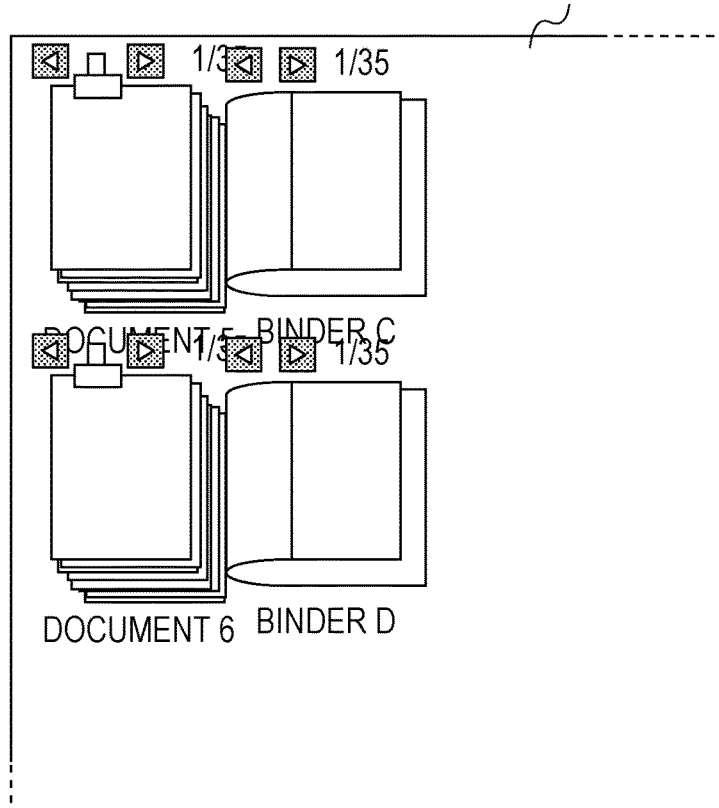
FIG. 6B illustrates a presentation of the documents and the binders presented in FIG. 6A, and the documents and the binders are reduced without being subjected to a display control according to this exemplary embodiment.

FIG. 6A illustrates some of the thumbnails displayed on the screen. The name of a document or binder (hereinafter, collectively referred to as a "document name") is presented directly under each of the thumbnails. FIG. 6B illustrates an example presentation of display images of the thumbnails presented in FIG. 6A, the thumbnails being reduced without being subjected to a characteristic display control according to this exemplary embodiment described below.

When the thumbnails are aligned and displayed as in FIG. 6A, the thumbnails or the document names may be presented superposed with adjacent thumbnails as depicted in FIG. 6B when the thumbnails or the document names are presented at a certain display magnification or larger. If the thumbnails are reduced in the same manner as the reduced images without taking into account the sizes of the accompanying images being displayed, the accompanying images or the document names are presented superposed with each other as in this example presentation.

Figure 6C:
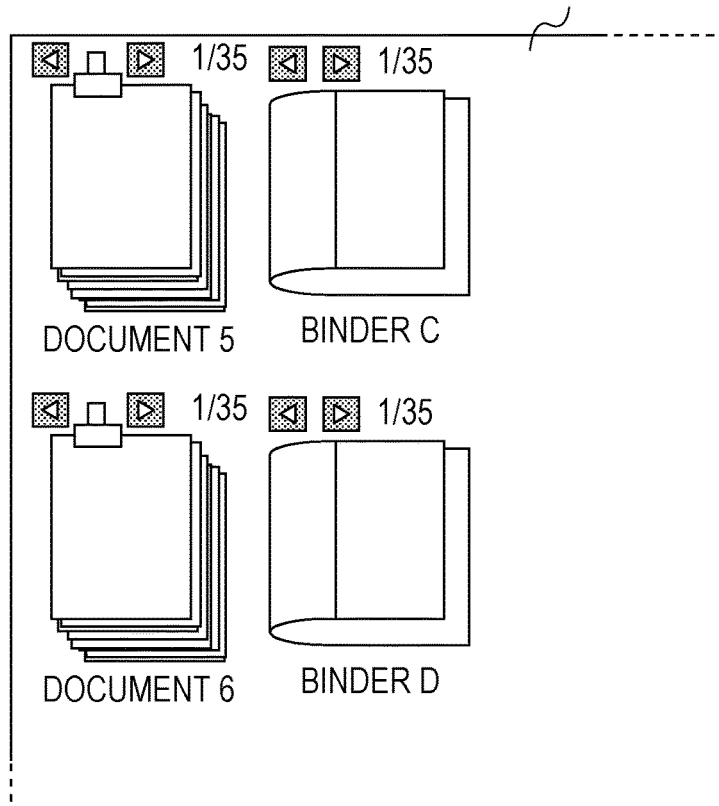
FIG. 6C illustrates a presentation of the documents and the binders presented in FIG. 6A, and the documents and the binders are reduced and subjected to the display control according to this exemplary embodiment.

Thus, it is characteristic of this exemplary embodiment that, when the display magnification of the thumbnails is changed and adjacent thumbnails are presented superposed with each other, the thumbnails are realigned in a manner that no thumbnail is presented superposed with other thumbnails. FIG. 6C illustrates an example presentation of the thumbnails that are reduced and subjected to the characteristic display control in this exemplary embodiment.

As exemplified in FIG. 6C, a first method to avoid superposition of the thumbnails and the document names is to simulate a situation in which the thumbnails and the document names are reduced in accordance with a specified display magnification and to determine whether the thumbnails and the document names are superposed in advance in accordance with the display positions where the thumbnails (reduced images and accompanying images) and the document names are placed before changing the display magnification, the display gaps between these thumbnails and document names before changing the display magnification, and the specified display magnification. It goes without saying that, in the simulation, it is assumed that the document thicknesses represented by the thickness images remain unchanged when the display magnification is changed. When it is determined that superposition occurs, the display gaps between the thumbnails are adjusted and the thumbnails are realigned so that no superposition occurs after changing the display magnification. Alternatively, in a second method, if the thumbnails are presented superposed after reducing the thumbnails in accordance with the display magnification, the thumbnails after the size reduction may be controlled to be realigned in positions where no superposition occurs after confirming that the thumbnails are superposed with each other.

Thus, thumbnail superposition that may occur if a thickness image of a document is not changed in accordance with the display magnification, which is the display control characteristic of this exemplary embodiment, is avoided in advance.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware processor programmed to:
display a thumbnail comprising a reduced image of a document and an accompanying image indicating a graphical representation of a thickness of the document corresponding to an amount of contents in the document; and
change a display magnification of the thumbnail upon a request from a user,
wherein, when the display magnification of the thumbnail is changed, a change amount of a display magnification of the accompanying image is less than a change amount of a display magnification of the reduced image, and wherein, when the display magnification of the thumbnail is changed, a number of pages of the document does not change, but the thickness of the accompanying image changes.

2. An information processing apparatus comprising:

a hardware processor programmed to:

display a plurality of thumbnails, each of the plurality of thumbnails comprising a reduced image of a document, a button to change page of the document and an accompanying image indicating a graphical representation of a thickness of the document corresponding to an amount of contents in the document; and change a display magnification of the plurality of thumbnails upon a request from a user, wherein, when the display magnification of the plurality of thumbnails is changed, a change amount of a display magnification of the button is less than a change amount of a display magnification of the reduced image, and wherein, when the display magnification of the plurality of thumbnails is changed, a number of pages of the document does not change, but the thickness of the accompanying image changes.

3. An information processing apparatus comprising:

a hardware processor programmed to:

display a plurality of thumbnails, each of the plurality of thumbnails comprising a reduced image of a document and an accompanying image indicating a graphical representation of a thickness of the document corresponding to an amount of contents in the document; and change a display magnification of the plurality of thumbnails upon a request from a user, wherein, when the display magnification of the plurality of thumbnails is changed, a change amount of a display magnification of the accompanying image is less than a change amount of a display magnification of the reduced image, and wherein, when the display magnification of the thumbnail is changed, a number of pages of the document does not change, but the thickness of the accompanying image changes.

* * * * *